Feb. 26, 1963 E. I. GROVE 3,079,460
WELDING CABLE
Filed April 10, 1959
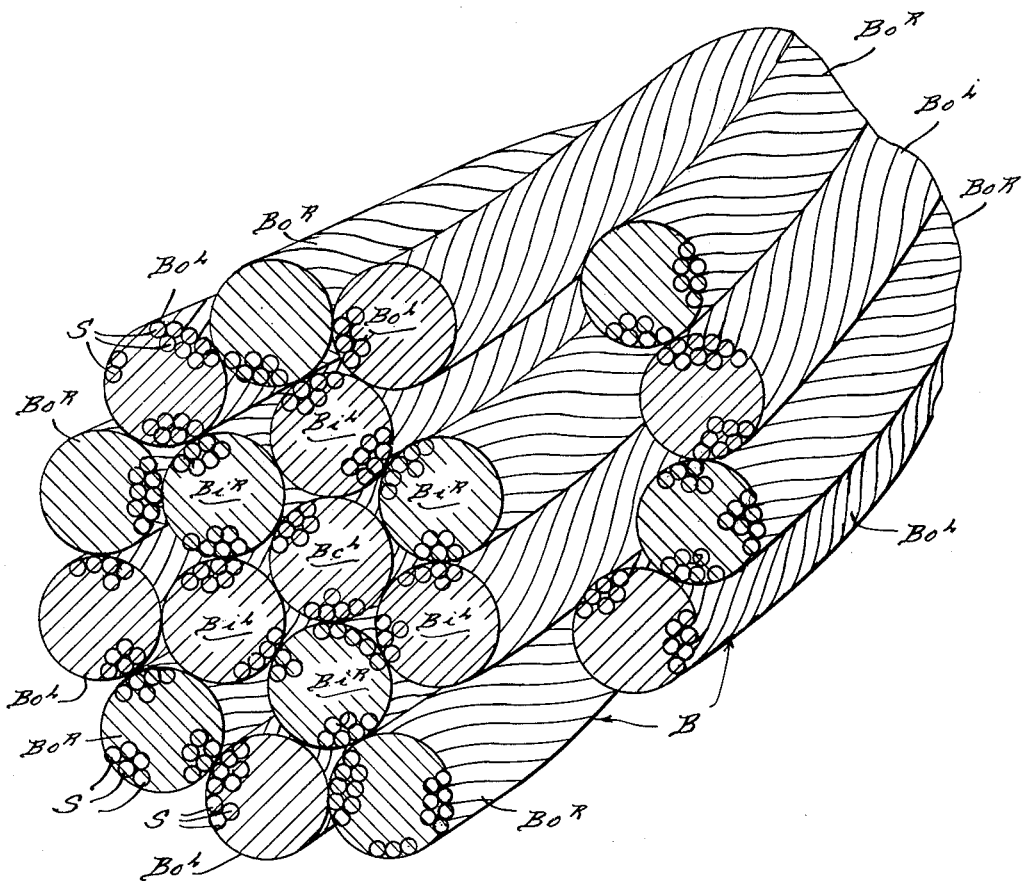
INVENTOR.
Earl I. Grove.
BY
Harness, Dickey & Pierce
ATTORNEYS.

United States Patent Office 3,079,460
Patented Feb. 26, 1963

3,079,460
WELDING CABLE
Earl I. Grove, Walled Lake, Mich., assignor to Gar Wood Industries, Inc., Detroit, Mich., a corporation of Michigan
Filed Apr. 10, 1959, Ser. No. 805,420
1 Claim. (Cl. 174—128)

The present invention relates to flexible electrical conductors, particularly for carrying heavy currents, the invention being especially adapted for use in the resistance welding art.

In order to provide sufficient flexibility in conductors of the indicated variety which are used to conduct welding current to the movable welding electrodes of a resistance welding machine, it has been found necessary to utilize cables constructed of a large number of fine strands of soft copper. In forming such a cable it is necessary, as a practical matter, to twist the strands together, in order to distribute the bending forces and to reduce the possibility of separation of individual strands or wires from the mass, with consequent increased possibility of damage to such individual strands. When the electrical energy conducted by such a cable is started, stopped, and varied in intensity, the varying magnetic fields induced about each of the individual conductors which are so twisted together will react upon one another, creating magnetically-induced forces and resultant movements of the individual constituent conductors of the cable, as well as distortion due to reaction with respect to any nearby cable with which the cable under consideration may be paired. Furthermore, due to the fine gauge and soft character of the individual strands, the severity and the damaging effects of such electromagnetically induced distortion are greater than would be the case if larger gauge strands and a stiffer material could be employed. The flexing forces above described result in a rubbing and striking of the individual conductors against one another. Under severe service conditions, individual strands of a conventional welding cable of the indicated character become broken within a relatively short time, necessitating frequent cable replacements. Such replacements, particularly in production machinery, are not only costly because of the cost of the cables themselves, but the necessity of shutting down the production machinery to change the cables is in many instances much more costly than the cable itself.

It is the object of the present invention to provide an improved welding cable employing a relatively large number of individual strands, which strands may be formed of soft copper of fine gauge intertwisted with one another so that the cable is highly flexible and bending forces are well distributed among the strands, but wherein the wearing forces which the individual strands exert upon one another in service are greatly reduced, thereby reducing the breakage of the strands and substantially prolonging the effective life of the cable.

Other objects, features and advantages of the present invention will become apparent from the following detailed description taken in conjunction with the accompanying drawing.

The single FIGURE of drawing shows on an enlarged scale an electrical cable constructed in accordance with the invention.

The cable consists of a plurality of sub-groups generally designated B, termed "bunches." Each of the bunches consists of a plurality of individual solid wire strands S. In a typical welding cable or conductor incorporating my invention and constructed as shown in the drawing, having an overall diameter in the neighborhood of ½ inch, the individual strands might be made of 30 B & S gauge copper wire, with approximately seventy-five strands per bunch. The nineteen bunches of the exemplary conductor illustrated are arranged in three concentric layers, comprising a centrally positioned or core bunch $B_c$, six surrounding intermediate bunches $B_i$, and twelve outer bunhces $B_o$, the latter bunches defining the peripheral outer layer. The six bunches of the intermediaae or "$B_i$ layer" are in contact, each with the next of such peripheral series, around and in contact with the core, while the twelve bunches of the outer or "$B_o$ layer" are in similar contact with each other, with two of the outer bunches bearing against each of the intermediate bunches.

The direction of twist or lay of the strands forming the core bunch $B_c$ is immaterial, a lefthand twist being shown. In each of the peripheral rows of surrounding bunches, however, that is, in the intermediate row formed by the bunches $B_i$, and also in the outer row formed by the bunches $B_o$, the strands of each bunch are twisted in a reverse direction to the strands in the next adjacent bunch in its peripheral row. Each peripheral group is formed of an even number of bunches, and the exponent L or R is applied to the designations of the bunches, to indicate left twist or right twist, respectively. The helix angle of the bunches having lefthand twist is the same as, although reversed with respect to, the helix angle of the bunches having righthand twist. Preferably also the helix angle is relatively low, in order to maintain a high degree of flexibility. I have successfully employed a helix angle of 13 degrees.

By virtue of the alternately reversed twist of adjacent bunches in each peripheral row, the individual strands of such peripherally adjacent bunches lie parallel to one another in the areas of contact between the strands of such adjacent bunches.

The electro-magnetic forces discussed above cause the individual bunches and strands to be alternately attracted toward and repelled from one another, thus causing them to rub longitudinally against one another. The same rubbing action is also caused by the mechanical flexing of the cable.

In order to avoid deterioration and failure of the cable, the most important desideratum is to prevent wear and breakage of the individual strands S, which are the most delicate elements of the cable. Where the portions of the strands which touch one another lie at an angle to each other, the area of contact is small. In fact, virtually point contact exists until wear has occurred. The unit pressures and concentrations of friction are therefore very high, and the strands will be rapidly worn through. By arranging in all possible instances for the contacting strands to lie parallel where they touch, however, the unit pressure is greatly reduced and the friction distributed, so that the strands can carry the mechanical loadings caused by the forces in question for a much longer period of time.

The greatest number of "potential trouble spots," that is, of positions where impact and rubbing might cause failure of the individual strands, exist where the individual bunches of the peripheral rows contact one another. In conventional welding cables as heretofore constructed, wherein, along the lines of contact between adjacent bunches, the strands of such adjacent bunches lie at an angle to one another, the unit pressures, and the concentration of friction, between the individual contacting strands of the adjacent bunches, cause such strands to wear through one another and break relatively rapidly in such regions.

The order of improvement attainable with my invention may be appreciated when the exemplary construction illustrated in the drawing is analyzed from this standpoint. All of the strands in the twelve lines of contact between the outer bunches of the "$B_o$" series have the contacting portions of the strands of adjacent bunches parallel, thereby distributing the bearing forces over the greatest possible areas. The same condition exists between the strands of the adjacent bunches of the "$Bi$" series, consisting of six lines of contact. In the preferred construction illustrated, each bunch of the $Bi$ series engages two bunches of the outer series $Bo$, and there will accordingly be lines of engagement in which the individual strands do not lie parallel to one another, between the intermediate bunches and half of the outer bunches. The number of such positions will be seen to be relatively low; however, there are, in fact, in the illustrated conductor, six such lines of higher unit contact pressures between the outer row and the intermediate row, and three corresponding lines of higher unit pressures between the core bunch $Bc^1$ and the bunches of the intermediate row. All such lines of higher unit pressure are located in the interior, where the bunches tend to confine the strands in their proper positioning, and the number of points of high friction will be seen to be reduced to a very low number.

In order to still further reduce the rubbing friction between strands, I preferably impregnate the cable with a lubricant such as a silicone type lubricant, or one which incorporates molybdenum disulfide.

It will thus be appreciated that with my invention the most delicate components, constituting the primary elements of the complete cable structure, are protected in a unique manner, by arranging them in such fashion as to distribute the forces which interact between the strands themselves. These benefits are achieved without added cost, and without sacrifice of the other desirable physical or electrical attributes of such a conductor, merely by a selected arrangement of the direction of twist of the sub-conductor elements.

Cables constructed in accordance with my invention may if desired incorporate a greater or lesser number of bunches and/or peripheral rows, and the gauge and the number of strands in each bunch may of course also be varied in accordance with service conditions, but regardless of such changes, successive bunches in each peripheral row are alternately reversed in the direction of twist.

A cable unit of the disclosed variety may also be employed as one of the "ropes" of a larger cable, such as that shown in the copending application of John S. Wreford, Serial No. 733,549, filed May 7, 1958, issued as U.S. Letters Patent No. 2,939,902, each such rope preferably being isolated from the other ropes of the cable by one or more friction-reducing sleeves and/or partitioning means, in accordance with the practice known in the trade and shown in said Wreford application.

While it will be apparent that the preferred embodiment of the invention herein described is well calculated to fulfill the objects and advantages first above stated, it will be appreciated that the invention is susceptible to variation, modification and change without departing from the fair meaning and proper scope of the appended claim.

What is claimed is:

A welding cable including a core and a plurality of longitudinally extending contiguous bunches, each of said bunches and said core comprising a plurality of conductive strands alike in size and number, said bunches being arranged in a plurality of peripheral layers concentrically surrounding said core, the layer adjacent said core consisting of six of said bunches and the next outer layer consisting of twelve of said bunches, the helical arrangement of all of said bunches in all of said layers being alike in direction and angle, and the strands of each bunch in each layer being twisted together at the same helix angle as, but in the opposite directional sense to, the strands in the next adjacent bunch in the same layer.

References Cited in the file of this patent

UNITED STATES PATENTS

| | | |
|---|---|---|
| 1,009,030 | Frederick | Nov. 14, 1911 |
| 1,201,290 | Harrison | Oct. 17, 1916 |
| 1,348,033 | Moon | June 27, 1920 |
| 2,939,902 | Wreford | June 7, 1960 |

FOREIGN PATENTS

| | | |
|---|---|---|
| 483,274 | Great Britain | Apr. 12, 1938 |